US010979892B2

(12) United States Patent
Jia et al.

(10) Patent No.: US 10,979,892 B2
(45) Date of Patent: Apr. 13, 2021

(54) EFFICIENT DEVICE CAPABILITIES ENQUIRY FOR 5G OR OTHER NEXT GENERATIONS WIRELESS NETWORK

(71) Applicant: AT&T Intellectual Property I, L.P., Atlanta, GA (US)

(72) Inventors: Yupeng Jia, Austin, TX (US); Ye Chen, Milton, GA (US); Yonghui Tong, Alpharetta, GA (US); Yakun Gao, Suwanee, GA (US); Wen Yang, Bellevue, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 2 days.

(21) Appl. No.: 16/526,781

(22) Filed: Jul. 30, 2019

(65) Prior Publication Data

US 2021/0037377 A1 Feb. 4, 2021

(51) Int. Cl.
*H04W 8/24* (2009.01)
*H04W 76/11* (2018.01)
*H04W 28/16* (2009.01)
*H04W 72/04* (2009.01)

(52) U.S. Cl.
CPC ............. *H04W 8/24* (2013.01); *H04W 28/16* (2013.01); *H04W 72/0453* (2013.01); *H04W 76/11* (2018.02)

(58) Field of Classification Search
CPC ....... H04W 8/24; H04W 76/11; H04W 28/16; H04W 72/0453
See application file for complete search history.

(56) References Cited

U.S. PATENT DOCUMENTS

| 9,433,032 | B1* | 8/2016 | Ghadge | H04W 84/08 |
|---|---|---|---|---|
| 2010/0316023 | A1* | 12/2010 | Zhang | H04W 76/12 370/335 |
| 2012/0127905 | A1* | 5/2012 | Lindoff | H04L 5/0098 370/311 |
| 2014/0179297 | A1* | 6/2014 | Sahoo | H04W 8/22 455/418 |
| 2014/0293818 | A1* | 10/2014 | Sesia | H04W 24/08 370/252 |
| 2015/0078287 | A1* | 3/2015 | Kim | H04W 16/14 370/329 |
| 2015/0215816 | A1* | 7/2015 | Abou-Elkheir | H04L 67/2847 370/230 |
| 2015/0358927 | A1* | 12/2015 | Gao | H04L 5/001 370/329 |
| 2017/0064753 | A1* | 3/2017 | Zhao | H04W 8/24 |
| 2017/0171739 | A1* | 6/2017 | Suzuki | H04W 72/06 |

(Continued)

*Primary Examiner* — Ajit Patel
*Assistant Examiner* — Wilfred Thomas
(74) *Attorney, Agent, or Firm* — Amin, Turocy & Watson, LLP

(57) ABSTRACT

Information used for establishing an initial connection with a network device is optimizable. For example, a system can comprise transmitting a service request to a network node device to establish a connection, receiving a device capability request message comprising a group of configuration parameters that comprise a bandwidth class, a component carrier parameter and a band type parameter, and in response to the receiving the device capability request message, transmitting a device capability report generated based on the group of configuration parameters.

20 Claims, 13 Drawing Sheets

(56) References Cited

U.S. PATENT DOCUMENTS

| | | | |
|---|---|---|---|
| 2018/0191414 A1* | 7/2018 | Suzuki | H04W 8/22 |
| 2018/0220295 A1* | 8/2018 | Takahashi | H04W 8/24 |
| 2018/0288643 A1* | 10/2018 | Schmidt | H04W 8/24 |
| 2019/0281604 A1* | 9/2019 | Kim | H04W 8/24 |
| 2020/0280896 A1* | 9/2020 | Ying | H04W 76/11 |
| 2020/0383103 A1* | 12/2020 | Zhou | H04L 5/005 |

* cited by examiner

EFFICIENT DEVICE CAPABILITIES ENQUIRY FOR 5G OR OTHER NEXT GENERATIONS WIRELESS NETWORK

TECHNICAL FIELD

This disclosure relates generally to optimizing connection failures and throughput degradation. More specifically, facilitating efficient device capabilities enquiry for establishing an initial connection with a network device, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. In 5G and other 4G/LTE technologies, for an initial connection with a network node device (e.g., base station, eNodeB, gNodeB and the like) a communication device (e.g., user equipment (UE), mobile device and the like) provides device capability information by transmitting a message (e.g., a radio resource control (RRC) message) to the network node device in response to an enquiry made by the network node device. The message informs the network node device all the UE's capabilities. This exchange allows the e/gNodeB to provide most efficient resources based on UE's capabilities. However, as more features are added to 5G/LTE, the information becomes large and complicated to process, which in some cases cause connection failure.

The above-described background relating to exchange for information between UE and network node device for establishing initial connection, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
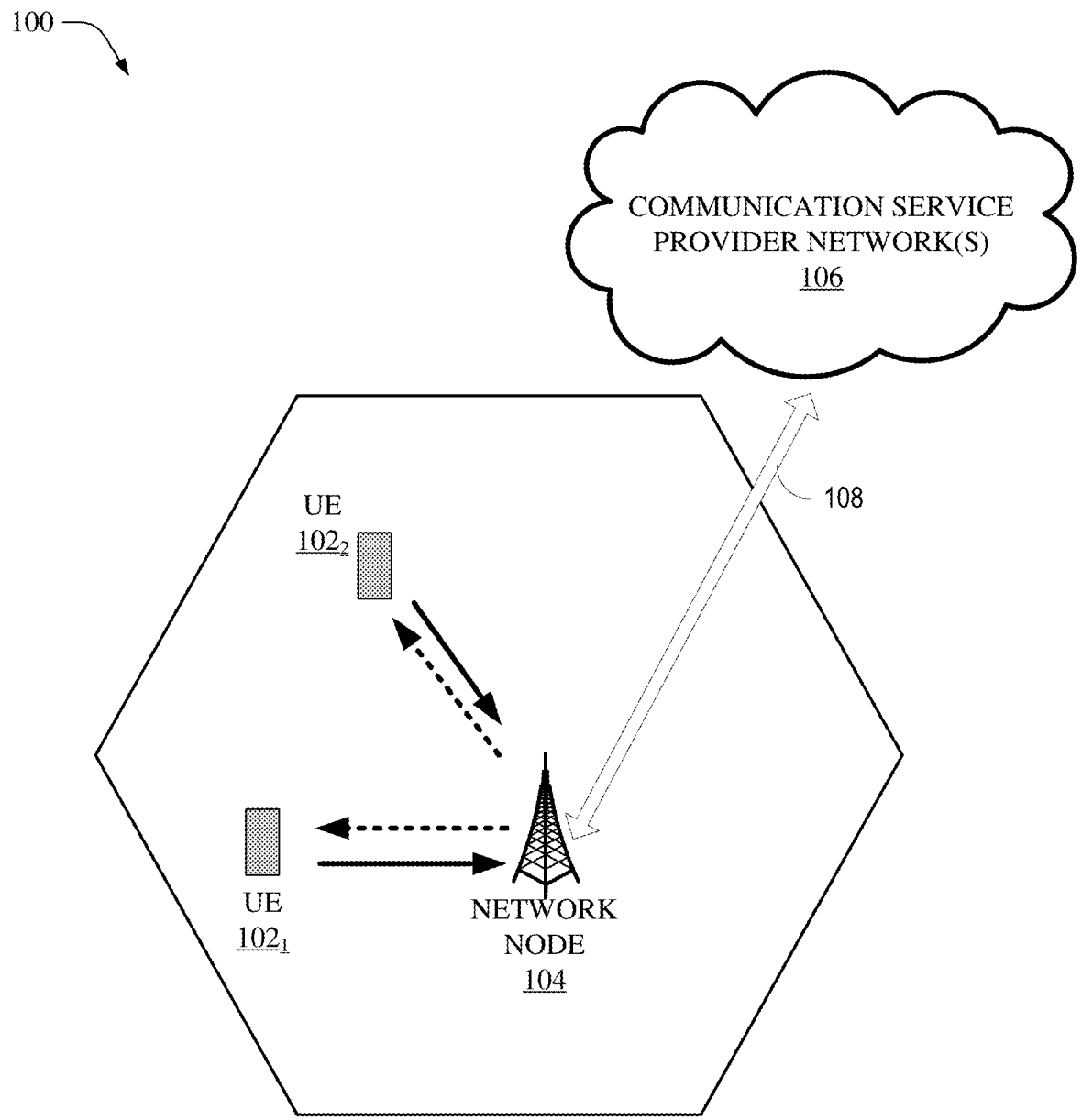
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate efficient device capabilities enquiry for establishing an initial connection with a network device. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate efficient device capabilities enquiry for establishing an initial connection with a network device. Facilitating efficient device capabilities enquiry for establishing an initial connection with a network device can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

4G LTE and 5G NR networks are expected to co-exist and overlap in the foreseeable future. For such LTE/NR wireless system, 5G UE, that also support LTE, needs to use carrier aggregation (CA) and dual connectivity (DC) (e.g., CA-DC) to combine LTE and 5G spectrum to maximize the speed, which requires 5G UE to pass both LTE and 5G UE capability to the RAN. Therefore, 5G UE has much more content in the UE capability message compared to LTE-only UE. The large size of UE capability message causes various problems listed below. For example, one problem is that an oversized UE capability message can cause issues with attaching (e.g., connecting to network node device). Per 3GPP, the max supported size of a PDCP SDU is 8188 octets. When the UE capability message is over the max size, UE fails to attach to the network. Also, another problem is that oversized UE capability message can cause UE to truncate the UE capability content to fit within the max size, resulting in reduced throughput due to fewer CA combinations. There are two leading causes for the message size increase on 5G UE. First is that, there are more CA combinations due to 5G NR and multi-RAT DC (MRDC). The 3× Non-Standalone (NSA) NR dual connectivity architecture introduced two more additional UE capabilities category—NR and multi-RAT dual connectivity (MR-DC), each one contain large number of CA combinations, the mmWave spectrum bandwidth (BW) is 10 times larger than LTE which introduced countless possibility of contiguous and none contiguous CA combinations based on the different component carriers (50 MHz, 100 MHz, 200 MHz) and BW classes multiply by the number of CA combination on LTE side. Also, 5G UE needs to support LTE advanced CA combinations such as 4×4 MIMO, 4CCA, 5CCA and 6CCA in addition to UMTS capability.

According to some embodiments, described herein is a self-optimized approach that facilitates customized device capabilities enquiry for establishing an initial connection with a network device. For example, utilize a sub category (e.g., BW class, number of CC, contiguous vs none contiguous CA-DC Type) in UE capability enquiry so 5G UE only generates what is applicable to the network configuration of the operator. RAN (e.g., eNB, gNB, network node device, or the like) has such knowledge of what spectrum and frequency are used in each cell site, as these are defined by the operators. For example, the RAN installed in a geographical location (e.g., US, UK, India, or China) is configured to store information about configurations utilized by the operators (e.g., some operator has contiguous set of carriers in a given frequency, while others using the same RAT, may have non-contiguous set of carriers available for use). Thus, the RAT can request a customized UE capability enquiry based on whether the operator is associated with the UE has contiguous vs. non-contiguous set of carriers.

According to an embodiment, to keep the UE capability message within 3GPP limit, the UE capability enquiry is based on whether the operator has access to contiguous or non-contiguous set of carriers in spectrum. For example, splitting the n260 (39 Ghz mmWave band) into contiguous vs non-contiguous band CA-DC type for the MRDC combinations. It should be noted that although various aspects and embodiments have been described herein in the context of n260, the disclosed aspects are not limited n260 as the techniques can also be applied other bands. Using this information, the RAN can customize (e.g., limit the size of UE capability message) the UE capability enquiry by providing a subcategory IE for CA-DC type (e.g., contiguous or non-contiguous) under each frequency band list for band information (freqBandList for bandInformationEUTRA and bandInformationNR) as part of the UE capability enquiry message (e.g., for example, requestedFreqBandsNR-MRDC-r15). For example,

```
value FreqBandList ::=
{
    bandInformationEUTRA :
    {
        bandEUTRA 17
```

```
        },
    bandInformationEUTRA :
        {
            bandEUTRA 2
        },
    bandInformationNR :
        {
            bandNR 260
            CA-DC type contiguous or non-contiguous
            BW class a to q
            number of CC 2 to 20
        }
}
```

In addition, include IE such as "CA bandwidth (BW) class" and "number of contiguous CC" in the enquiry to further narrow down the request, so UE only sends the CA and/or DC combination that is applicable only to the pertinent network configuration. In some embodiments, the RAN is configured to generate and transmit a message comprising the additional band subcategory information (e.g., CA-DC type contiguous, non-contiguous, CA BW class, and number of contiguous CC) and the UE is configured to receive and process a message received from RAN that comprises these additional subcategory information For example, assume that an operator only has 400 MHz contiguous spectrum in n260 band configured in the cell site the 5G UE is served on. In this scenario, the UE capability enquiry may include only contiguous CA-DC type under band NR 260. The bandwidth class may also be provided. In another example, assume that the operator only has up to 400 MHz non-contiguous spectrum configured in the cell site the UE is served on, with each carrier up to 100 MHz. This scenario, the UE capability enquiry may include only non-contiguous CA-DC type under band NR 260 in the UE capability enquiry. The enquiry may also include a bandwidth class and number of CC (e.g., 4), so UE only reports up to 4 non-contiguous carriers in NR and MRDC combination.

According to some embodiments, to lower the UE capacity message size, the RAN (e.g., e/gNB, network node device, or the like), can include a CA-DC type parameter (e.g., contiguous or non-contiguous to limit the MRDC combinations), a CA bandwidth class (e.g., A, B or the like) and number of CC (e.g., 2,3,4 etc.) which is determined based on spectrum available to an operator associated with the UE. The UE will include technology that will facilitate decoding and extracting parameter information (e.g., CA-DC type such as contiguous or non-contiguous, CA BW class and number of CC) that is included in the UE capability enquiry.

According to an embodiment, a system can comprise a processor and a memory that stores executable instructions that, when executed by the processor, facilitate performance of operations comprising receiving a service request from a network device. The system can further facilitate transmitting a service request to a network node device to establish a connection. The system can facilitate, receiving a device capability enquiry associated with a group of configuration parameters that comprise a band type (band carrier aggregation and dual connectivity type—CA-DC type), a CA bandwidth class, a number of component carrier parameter. The system can further facilitate, in response to the receiving the device capability enquiry, transmitting a device capability message generated based on the group of configuration parameters.

According to another embodiment, described herein is a method that can comprise transmitting, by a device comprising a processor, a service request to a network node device to establish a connection. The method can receive, by the device, a device capability enquiry message comprising a group of configuration parameters that comprise a bandwidth class, a number of component carrier parameter and a band type parameter. The method can further, in response to the receiving the device capability request message, transmitting, by the device, a device capability report generated based on the group of configuration parameters.

According to yet another embodiment, a device can comprise a processor and a memory that stores executable instructions that, when executed by the processor, facilitate performance of operations comprising receiving an attach request from a first network device. The device can further comprise transmitting a service request to a network node device to establish a connection, wherein the service request comprises operator information. The device can further comprise receiving a device capability enquiry, wherein the device capability enquiry comprises one or more additional subcategory of the band information such as a band type (contiguous or non-contiguous), a bandwidth class (e.g., carrier aggregation bandwidth class), a number of component carrier parameter. The device can further, in response to the receiving the device capability enquiry, transmitting a device capability message generated based on the band type, the bandwidth class, the number of component carrier parameter.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
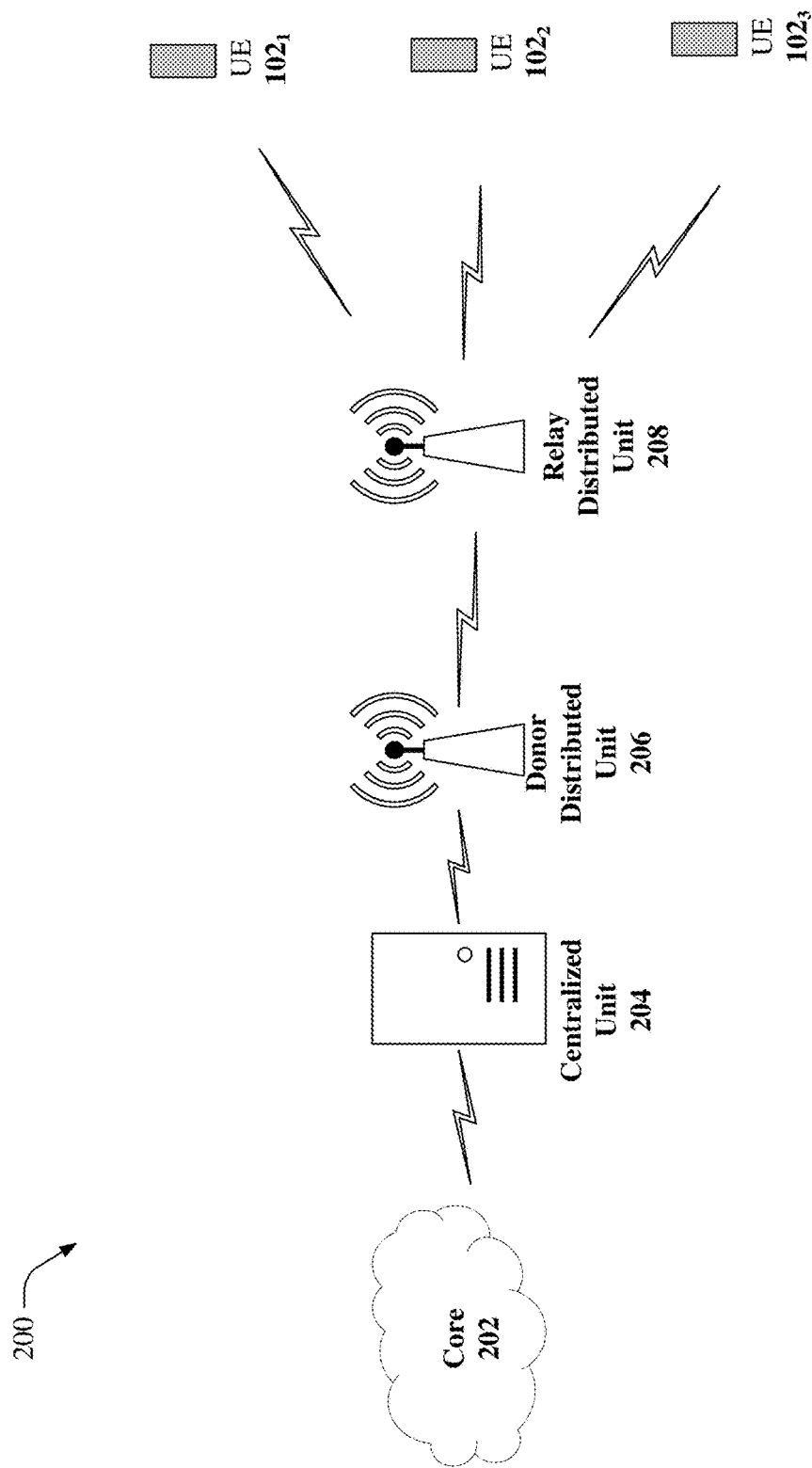
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs 1021, 1022, 1023. The donor distributed unit 206 (e.g., access point) can have a wired backhaul with a protocol stack and can relay the user traffic for the UEs 1021, 1022, 1023 across the IAB and backhaul link. Then the relay distributed unit 208 can take the backhaul link and convert it into different strains for the connected UEs 1021, 1022, 1023. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
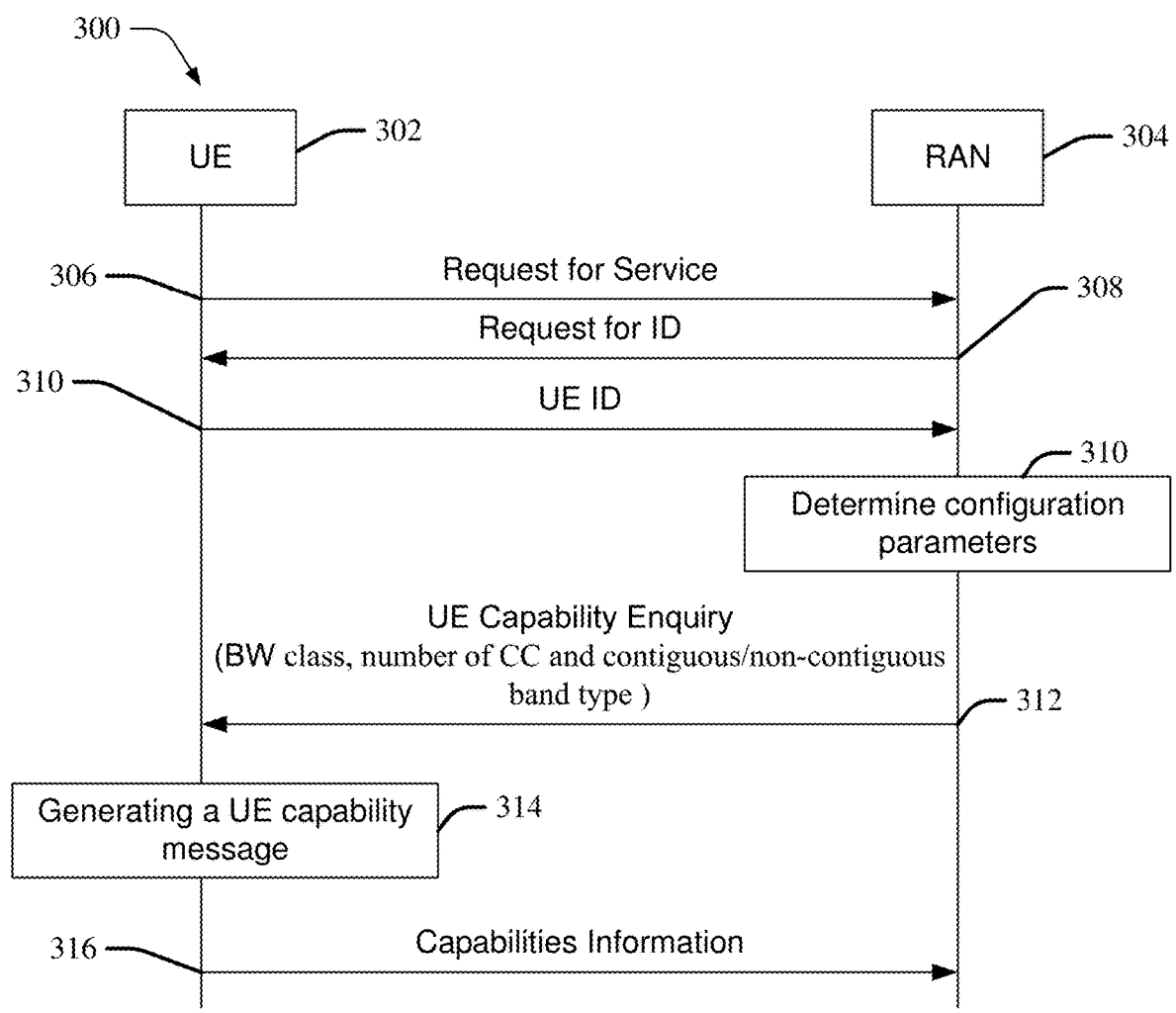
FIG. 3 illustrates an example exchanges between UE and a network node device in accordance with various aspects and embodiments described herein.

FIG. 3, illustrates an example of message exchanges 300 between UE 302 and a network node device 304 (e.g., RAN—eNB or gNB, interchangeability used herein) in accordance with various aspects and embodiments described herein. In LTE and LTE-5G systems, when a UE 302 is seeking establish a connection with a network node device 304, the UE 302 transmits a request for service message 306. Upon receiving the request for service message 306, the network node device 304 requests for a UE ID and/or operator information associated with the UE 302. The UE 302 provides the UE ID in message 308. Upon receiving the UE ID message 308, the network node device 304 based on location where it is installed/located, determines configuration parameters associated with an operator. For example, but not limited to, spectrum size, bandwidth class, contiguous or non-contiguous carriers, etc. available to the operator in the geographical location and/or market. Upon determining the configuration parameters, the network node device 304 can determine how to customize the UE capability message to only include what is needed. The network node device 304, generates a UE capability enquiry message 312 and transmits the message to UE 302. Upon receiving the message 312, the UE 302 at 314 generates a UE capability message based on configuration message. For example, CA combination based on whether available BW for the operator is contiguous or non-contiguous. For example, based on the determining indicating that the band CA-DC type parameter indicates the contiguous band category, generating a report comprising combinations of supported bandwidth capabilities based on contiguous bandwidth associated with the bandwidth class. Also, based on the determining indicating that the band CA-DC type parameter does not indicates the contiguous band CA-DC type, generating a report comprising combinations of supported bandwidth capabilities in accordance with non-contiguous carriers associated with the bandwidth class. Upon generating the UE capabilities message, UE 302 transmits the message 316.

Figure 4:
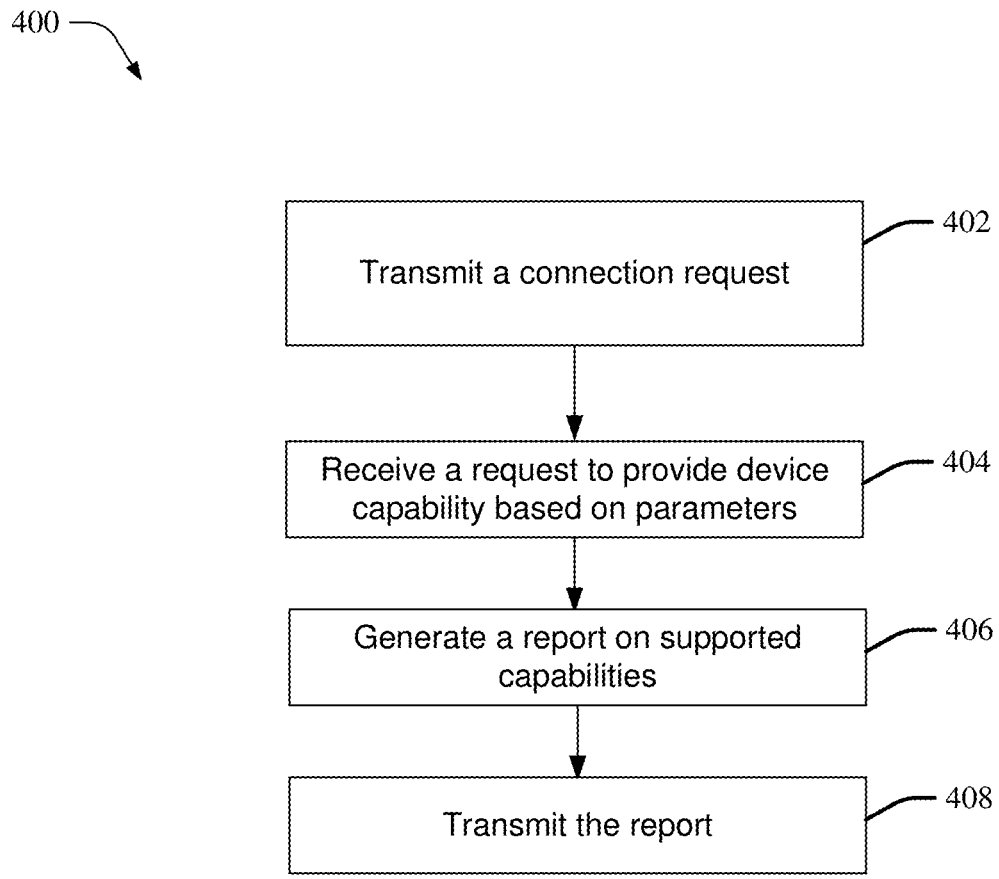
FIG. 4 illustrates an example of an operation flow utilized by UE in accordance with various aspects and embodiments described herein.

FIG. 4 illustrates an example of an operation flow 400 utilized by UE 302 in accordance with various aspects and embodiments described herein. At 402, the UE 302 of FIG. 3 transmits a connection request to the network node device 304 of FIG. 3. Thereafter, the UE can monitor for request of UE capabilities. At 404, the UE 302 receives a request to provide device capability based on various parameters generated by the network node device 304 to limit the UE capability message size. At 406, the UE 302 generates a report of supported capabilities in accordance with parameters provided by the network node device 304. For example, UE 302 will generate a group of CA combinations or UE capability combinations based on whether the operator, associated with the UE 302, has access to contiguous or non-contiguous carriers. In some embodiment, the UE 302 is configured to receive and decode a message comprising a band CA-DC type information (e.g., information about contiguous or non-contiguous band, BW class, and number of CC). At 408, the UE 302 transmits the UE capability message.

Figure 5:
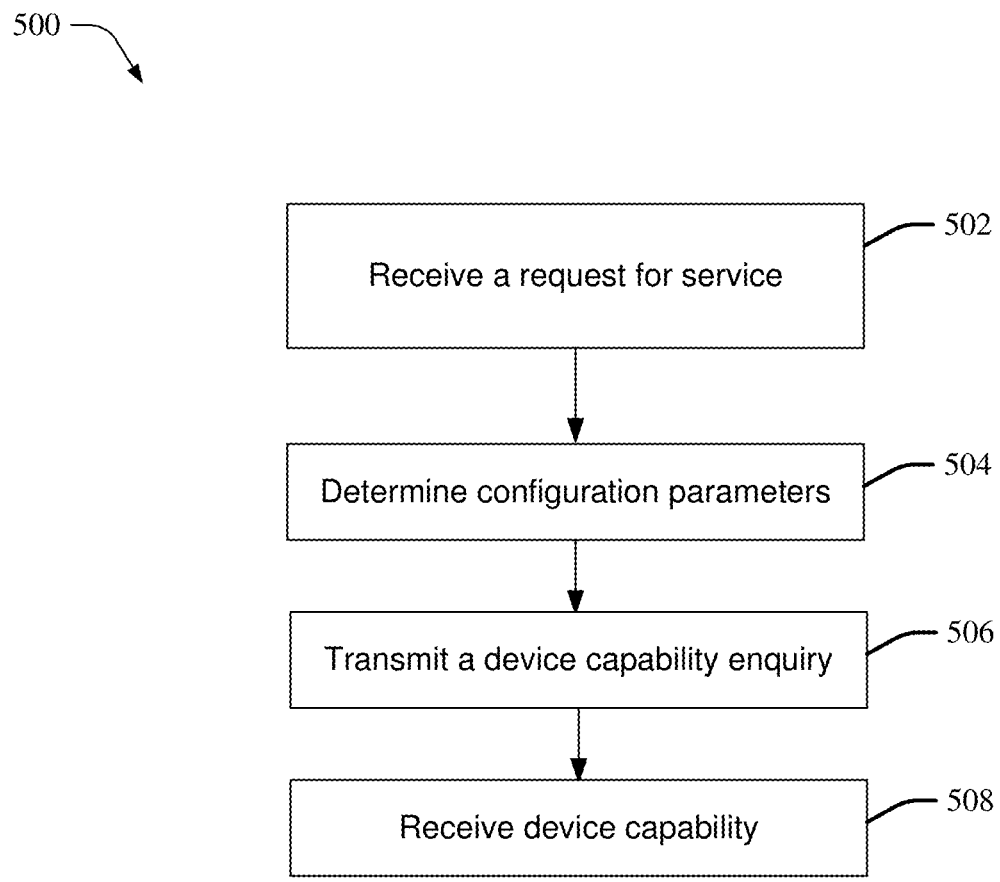
FIG. 5 illustrates an example of an operation flow utilized by RAT 304 in accordance with various aspects and embodiments described herein.

FIG. 5 illustrates an example of an operation flow 500 utilized by network node device 304 in accordance with various aspects and embodiments described herein. At 502, the network node device 304 receives an initial request for service from a UE 302. The network node device 304 can be configured to recode the request, including UE ID and operation information if provided by the UE. At 504, utilizing the information from the request, the network node device 304 can generate a UE capability enquiry with parameters selected based on operator information (e.g., available spectrum and whether the carriers are contiguous or non-contiguous). In some embodiment, the network node device 304 includes a band CA-DC type parameter, a BW class and number of CC. At 506, the UE capability enquiry is transmitted to the UE 302. In some embodiments, the network node device 304 in configured to transmit a message comprising the band CA-DC type parameter, the BW class and number of CC. At 508, the network node device 304 receives the UE capability message.

Figure 6:
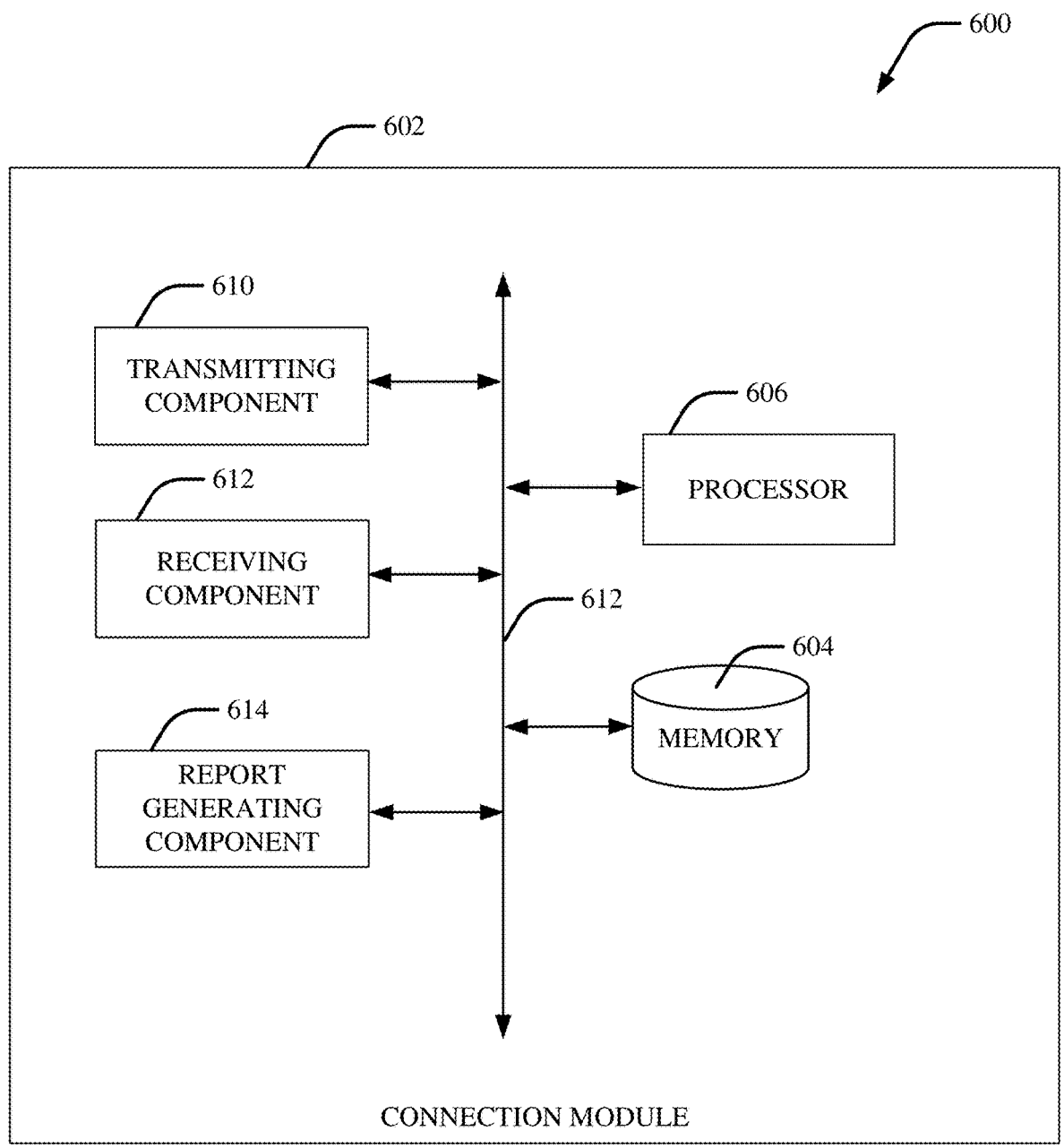
FIG. 6 illustrates a block diagram of an example, non-limiting system that facilitates efficient device capabilities enquiry for establishing an initial connection with a network device in accordance with one or more embodiments described herein.

FIG. 6 illustrates a block diagram of an example, non-limiting system 600 that facilitates efficient device capabilities enquiry for establishing an initial connection with a network device in accordance with one or more embodiments described herein. According to some embodiments, the system 600 can comprise a connection module 602. In some embodiments, the connection module 602 can also include or otherwise be associated with a memory 604, a processor 606 that executes computer executable components stored in a memory 604. The connection module 602 can further include a system bus 608 that can couple various components including, but not limited to, a transmitting component 610, a receiving component 612, and a report generating component 614.

Aspects of systems (e.g., the connection module 602 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the connection module 602 can comprise various computer and/or computing-based elements described herein with reference to operating environment 1300 and FIG. 13. In several embodiments, such computer and/or computing-based elements can be used in connection with implementing one or more of the systems, devices, and/or components shown and described in connection with FIG. 6 or other figures disclosed herein.

The memory 604 can store one or more computer and/or machine readable, writable, and/or executable components and/or instructions that, when executed by processor 606, can facilitate performance of operations defined by the executable component(s) and/or instruction(s). For example, the memory 604 can store computer and/or machine readable, writable, and/or executable components and/or instructions that, when executed by the processor 606, can facilitate execution of the various functions described herein relating to the transmitting component 610, the receiving component 612, and the report generating component 614.

In several embodiments, the memory 604 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 604 are described below with reference to system memory 1306 and FIG. 13. Such examples of memory 604 can be employed to implement any embodiments of the subject disclosure.

According to some embodiments, the processor 606 can comprise one or more types of processors and/or electronic circuitry that can implement one or more computer and/or machine readable, writable, and/or executable components and/or instructions that can be stored on the memory 604. For example, the processor 606 can perform various operations that can be specified by such computer and/or machine readable, writable, and/or executable components and/or instructions including, but not limited to, logic, control, input/output (I/O), arithmetic, and/or the like. In some embodiments, processor 606 can comprise one or more central processing unit, multi-core processor, microprocessor, dual microprocessors, microcontroller, System on a Chip (SOC), array processor, vector processor, and/or another type of processor.

In some embodiments, the processor 606, the memory 604, the transmitting component 610, the receiving component 612, and the report generating component 614 can be communicatively, electrically, and/or operatively coupled to one another via the system bus 608 to perform functions of the connection module 602, and/or any components coupled therewith. In several embodiments, the system bus 608 can comprise one or more memory bus, memory controller, peripheral bus, external bus, local bus, and/or another type of bus that can employ various bus architectures.

In several embodiments, the connection module 602 can comprise one or more computer and/or machine readable, writable, and/or executable components and/or instructions that, when executed by the processor 606, can facilitate performance of operations defined by such component(s) and/or instruction(s). Further, in numerous embodiments, any component associated with the connection module 602, as described herein with or without reference to the various figures of the subject disclosure, can comprise one or more computer and/or machine readable, writable, and/or executable components and/or instructions that, when executed by the processor 606, can facilitate performance of operations defined by such component(s) and/or instruction(s). For example, the transmitting component 610, and/or any other components associated with the connection module 602 (e.g., communicatively, electronically, and/or operatively coupled with and/or employed by connection module 602), can comprise such computer and/or machine readable, writable, and/or executable component(s) and/or instruction(s). Consequently, according to numerous embodiments, the connection module 602 and/or any components associated therewith, can employ the processor 606 to execute such computer and/or machine readable, writable, and/or executable component(s) and/or instruction(s) to facilitate performance of one or more operations described herein with reference to the connection module 602 and/or any such components associated therewith.

In some embodiments, the connection module 602 can facilitate performance of operations related to and/or executed by the components of connection module 602, for example, the processor 606, the memory 604, the transmitting component 610, the receiving component 612, and the report generating component 614. For example, as described in detail below, the connection module 602 can facilitate: receiving, (e.g., by the transmitting component 610) a service request from a network device; determining (e.g., by the receiving component 612) a first size of a network device capabilities message, wherein the determining is based on a second size of the network device capability message previously collected from the network device; and based on a first result of analyzing the first size of the network device capabilities message and a message size threshold, determining (e.g., by the report generating component 614) that the network device capabilities message is not greater than the message size threshold, and requesting the network device to provide the network device capabilities message associated with network device capabilities in accordance with a single step enquiry.

In some embodiments, the transmitting component 610, can comprise one or more processors, memory, and electrical circuitry. The transmitting component 610 transmitting a service request to a network node device to establish a connection. When a UE 302 seeks to make a connection with the network node device, the UE transmits a service request. This request can be received at the network node device. The transmitting component 610 can provide information about the UE, such as, UE identification and operator information associated with the UE, priority level and quality of service assigned to the UE 302 or for this request. In some embodiments, the transmission component 610 transmitting a device capability message generated based on the group of configuration parameters.

In some embodiments, the receiving component 612, can comprise one or more processors, memory, and electrical circuitry. The receiving component 612, receiving a device capability enquiry associated with a group of configuration parameters that comprise a bandwidth class, a component carrier parameter and a band CA-DC type parameter. According to some embodiments, the receiving component 612 is configured to receive the bandwidth class, the component carrier parameter and the band CA-DC type parameter and extract necessary information to generate a UE capability message according to parameters.

In some embodiments, the report generating component 614, can comprise one or more processors, memory, and electrical circuitry. The optimizing component 614, determining whether the band CA-DC type parameter indicates a contiguous band CA-DC type. Based on the determining indicating that the band CA-DC type parameter indicates the contiguous band CA-DC type, generating a report comprising combinations of available bandwidth capabilities based on contiguous bandwidth associated with the bandwidth class. If the band CA-DC type indicates a non-contiguous band CA-DC type, the optimizing component 614 generating a report comprising combinations of available bandwidth capabilities based on non-contiguous carriers associated with the bandwidth class.

Figure 7:
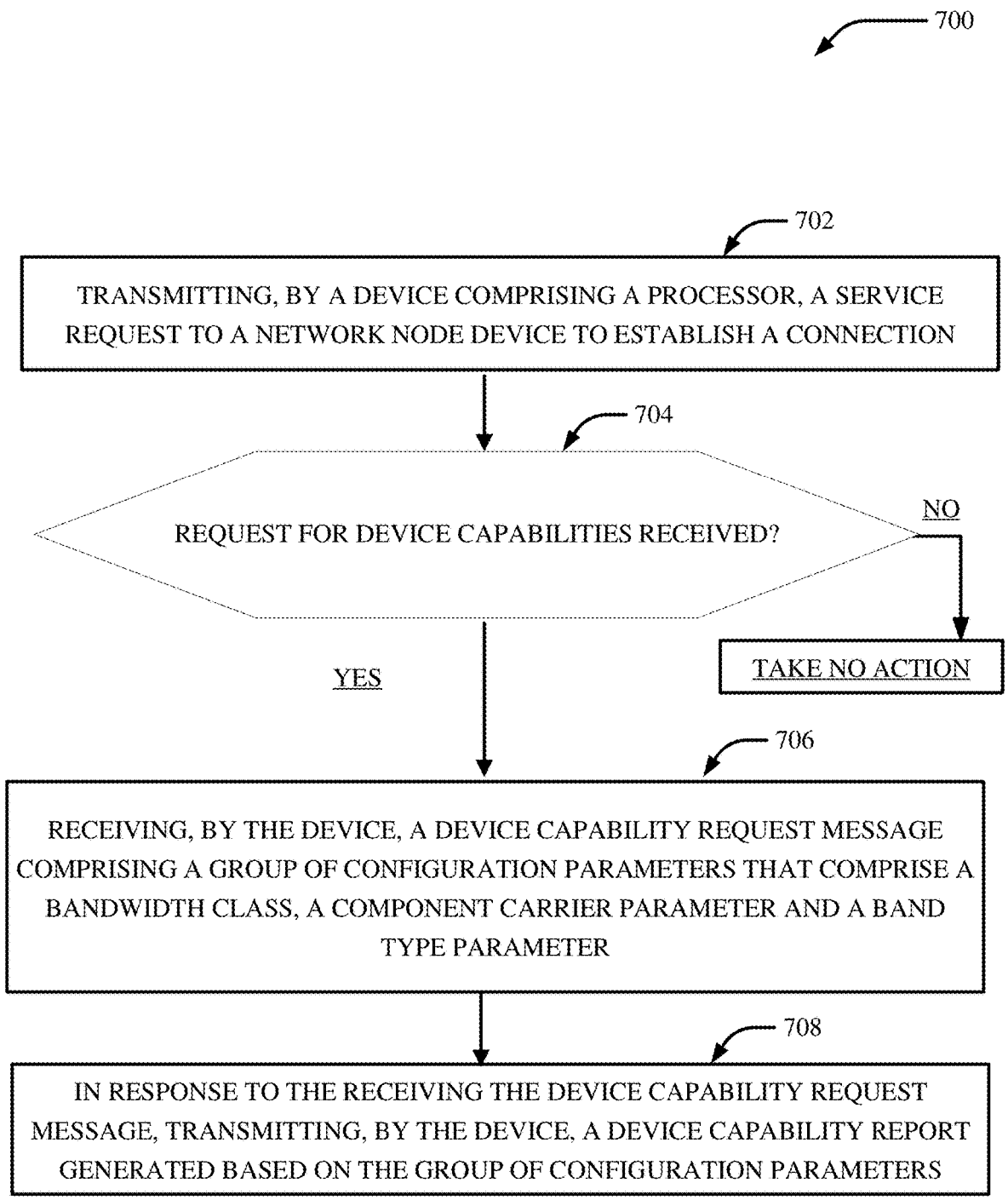
FIG. 7 depicts a diagram of an example, non-limiting computer implemented method that facilitates efficient device capabilities enquiry for establishing an initial connection with a network device in accordance with one or more embodiments described herein.

FIG. 7 depicts a diagram of an example, non-limiting computer implemented method that facilitates efficient device capabilities enquiry for establishing an initial connection with a network device in accordance with one or more embodiments described herein. In some examples, flow diagram 700 can be implemented by operating environment 1300 described below. It can be appreciated that the operations of flow diagram 700 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts transmitting a service request to a network node device to establish a connection (e.g., to initiate a connection with the network node device, The UE 302 (e.g., FIG. 3) transmits a service request message). The UE 302 monitors for request for device capabilities. Operation 704 depicts determining if a request for device capabilities was received. If determined that the request for device capabilities was received, then perform operation 706. Otherwise, take no action and continue monitoring. Operation 706 depicts receiving, by the device, a device capability request message comprising a group of configuration parameters that comprise a bandwidth class, a component carrier parameter and a band CA-DC type parameter. Upon receiving configuration parameters, The UE 302 (e.g., FIG. 3) generates a report in accordance with parameters provided by the network node device. Operation 708 depicts in response to the receiving the device capability request message, transmitting, by the device, a device capability report generated based on the group of configuration parameters.

Figure 8:
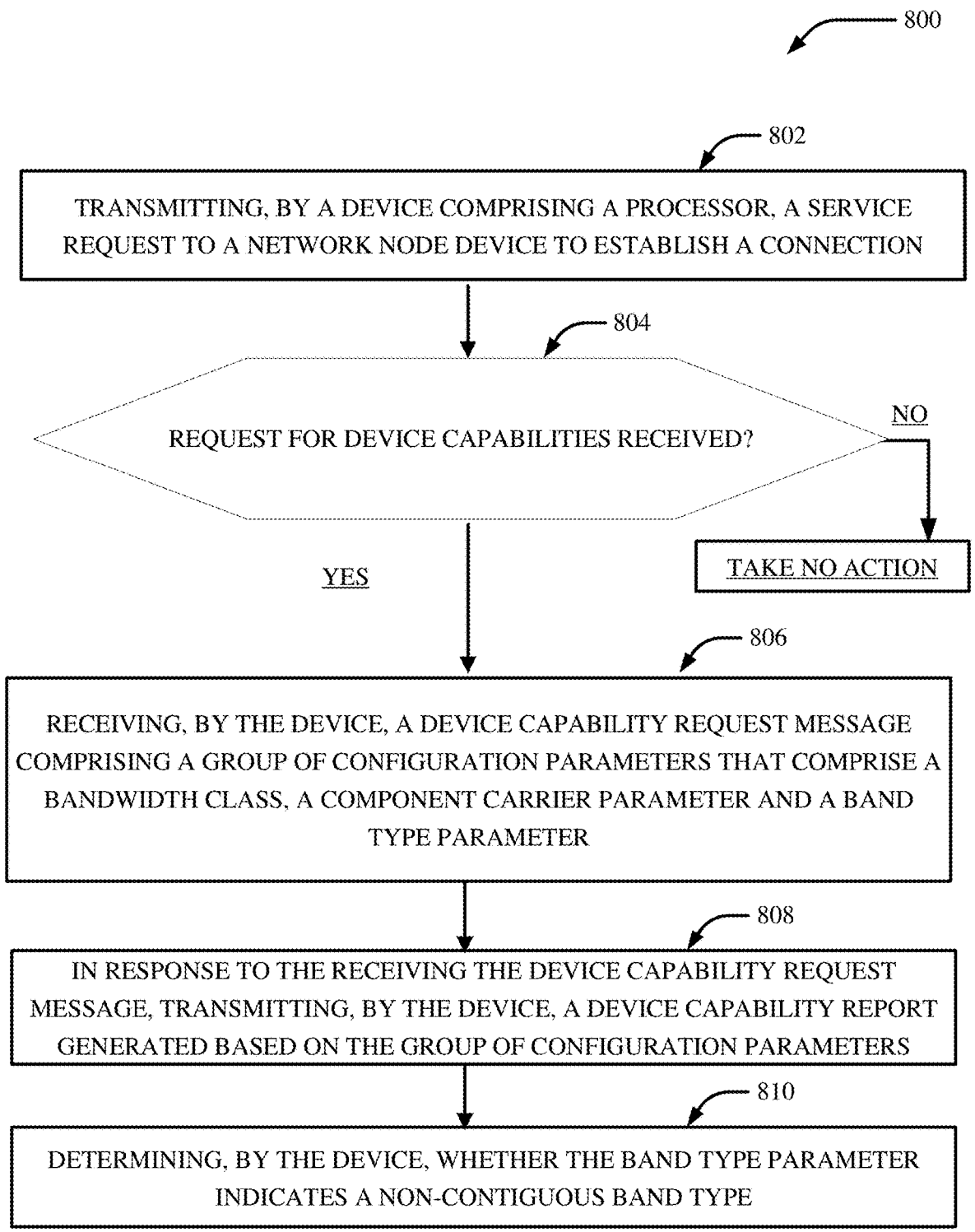
FIG. 8 depicts a diagram of an example, non-limiting computer implemented method that facilitates efficient device capabilities enquiry for establishing an initial connection with a network device in accordance with one or more embodiments described herein.

FIG. 8 depicts a diagram of an example, non-limiting computer implemented method that facilitates efficient device capabilities enquiry for establishing an initial connection with a network device in accordance with one or more embodiments described herein. In some examples, flow diagram 800 can be implemented by operating environment 1300 described below. It can be appreciated that the operations of flow diagram 800 can be implemented in a different order than is depicted.

In non-limiting example embodiments, a computing device (or system) (e.g., computer 1304) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts transmitting a service request to a network node device to establish a connection (e.g., to initiate a connection with the network node device, The UE 302 (e.g., FIG. 3) transmits a service request message). The UE 302 (e.g., FIG. 3) monitors for request for device capabilities. Operation 804 depicts determining if a request for device capabilities was received. If determined that the request for device capabilities was received, then perform operation 806. Otherwise, take no action and continue monitoring. Operation 806 depicts receiving, by the device, a device capability request message comprising a group of configuration parameters that comprise a bandwidth class, a component carrier parameter and a band CA-DC type parameter. Upon receiving configuration parameters, The UE 302 (e.g., FIG. 3) generates a report in accordance with parameters provided by the network node device. Operation 808 depicts in response to the receiving the device capability request message, transmitting, by the device, a device capability report generated based on the group of configuration parameters. Operation 810 depicts determining, by the device, whether the band CA-DC type parameter indicates a non-contiguous band CA-DC type.

Figure 9:
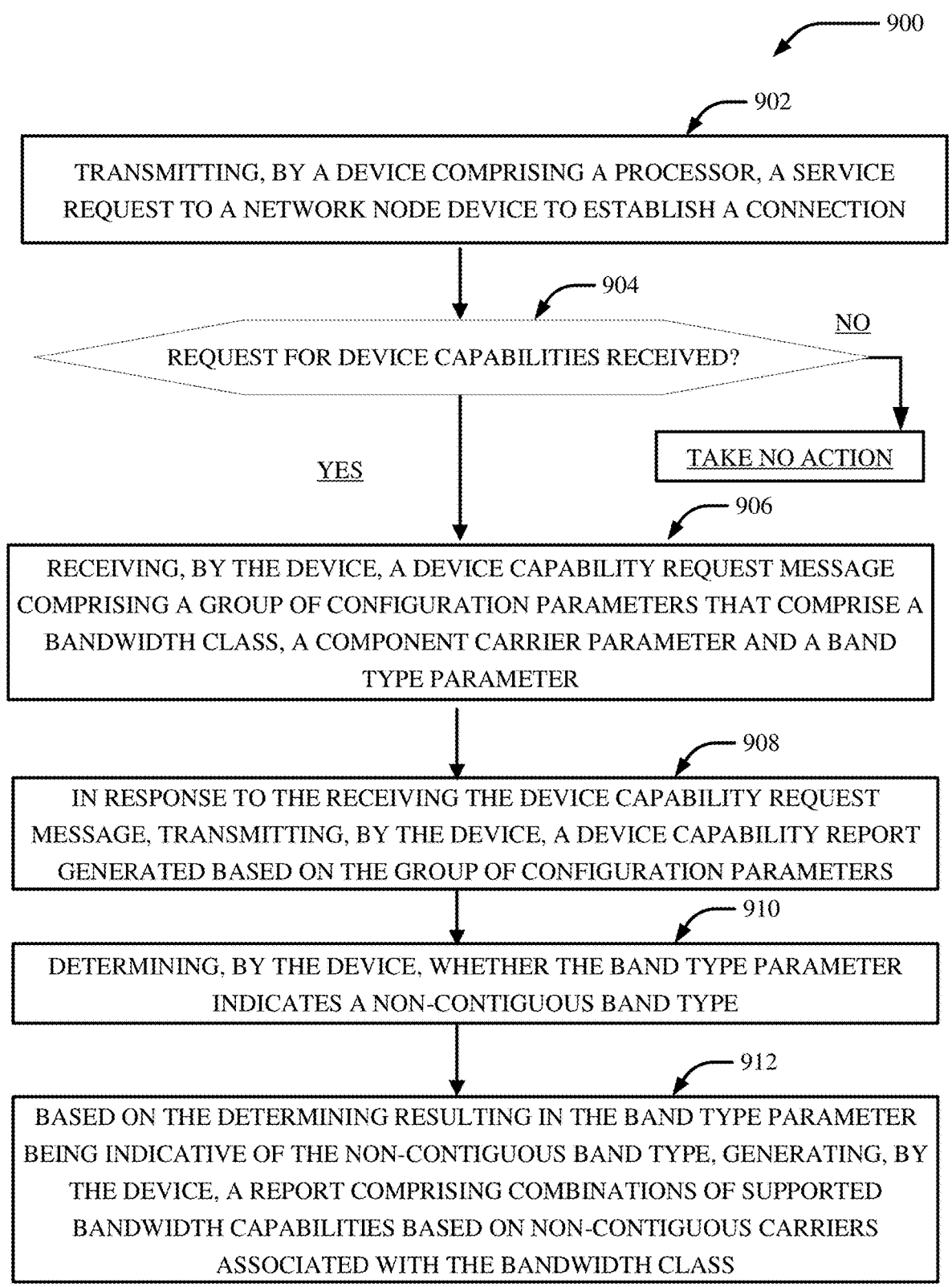
FIG. 9 depicts a diagram of an example, non-limiting computer implemented method that facilitates efficient device capabilities enquiry for establishing an initial connection with a network device in accordance with one or more embodiments described herein.

FIG. 9 depicts a diagram of an example, non-limiting computer implemented method that facilitates efficient device capabilities enquiry for establishing an initial connection with a network device in accordance with one or more embodiments described herein. In some examples, flow diagram 900 can be implemented by operating environment 1300 described below. It can be appreciated that the operations of flow diagram 900 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts transmitting a service request to a network node device to establish a connection (e.g., to initiate a connection with the network node device, The UE 302 (e.g., FIG. 3) transmits a service request message). The UE 302 (e.g., FIG. 3) monitors for request for device capabilities. Operation 904 depicts determining if a request for device capabilities was received. If determined that the request for device capabilities was received, then perform operation 906. Otherwise, take no action and continue monitoring. Operation 906 depicts receiving, by the device, a device capability request message comprising a group of configuration parameters that comprise a bandwidth class, a component carrier parameter and a band CA-DC type parameter. Upon receiving configuration parameters, The UE 302 (e.g., FIG. 3) generates a report in accordance with parameters provided by the network node device. Operation 908 depicts in response to the receiving the device capability request message, transmitting, by the device, a device capability report generated based on the group of configuration parameters. Operation 910 depicts determining, by the device, whether the band CA-DC type parameter indicates a non-contiguous band CA-DC type. Operation 912 depicts based on the determining resulting in the band CA-DC type parameter being indicative of the non-contiguous band CA-DC type, generating, by the device, a report comprising combinations of supported bandwidth capabilities based on non-contiguous carriers associated with the bandwidth class.

Figure 10:
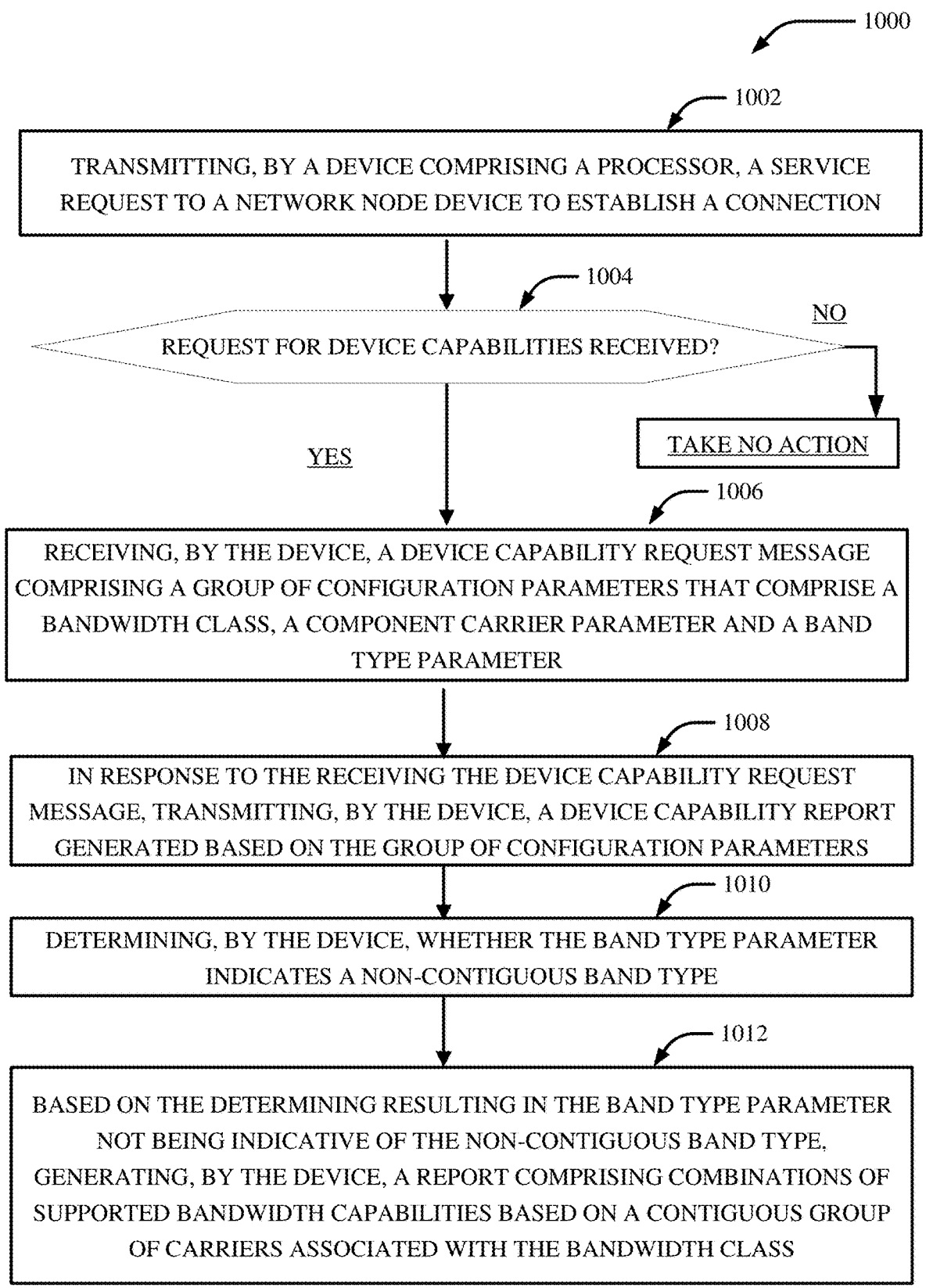
FIG. 10 depicts a diagram of an example, non-limiting computer implemented method that facilitates efficient device capabilities enquiry for establishing an initial connection with a network device in accordance with one or more embodiments described herein.

FIG. 10 depicts a diagram of an example, non-limiting computer implemented method that facilitates efficient device capabilities enquiry for establishing an initial connection with a network device in accordance with one or more embodiments described herein. In some examples, flow diagram 1000 can be implemented by operating environment 1300 described below. It can be appreciated that the operations of flow diagram 1000 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts transmitting a service request to a network node device to establish a connection (e.g., to initiate a connection with the network node device, The UE 302 (e.g., FIG. 3) transmits a service request message). The UE 302 (e.g., FIG. 3) monitors for request for device capabilities. Operation 1004 depicts determining if a request for device capabilities was received. If determined that the request for device capabilities was received, then perform operation 1006. Otherwise, take no action and continue monitoring. Operation 1006 depicts receiving, by the device, a device capability request message comprising a group of configuration parameters that comprise a bandwidth class, a component carrier parameter and a band CA-DC type parameter. Upon receiving configuration parameters, The UE 302 (e.g., FIG. 3) generates a report in accordance with parameters provided by the network node device. Operation 1008 depicts in response to the receiving the device capability request message, transmitting, by the device, a device capability report generated based on the group of configuration parameters. Operation 1010 depicts determining, by the device, whether the band CA-DC type parameter indicates a non-contiguous band CA-DC type. Operation 1012 depicts based on the determining resulting in the band CA-DC type parameter not being indicative of the non-contiguous band CA-DC type, generating, by the device, a report comprising combinations of supported bandwidth capabilities based on a contiguous group of carriers associated with the bandwidth class.

Figure 11:
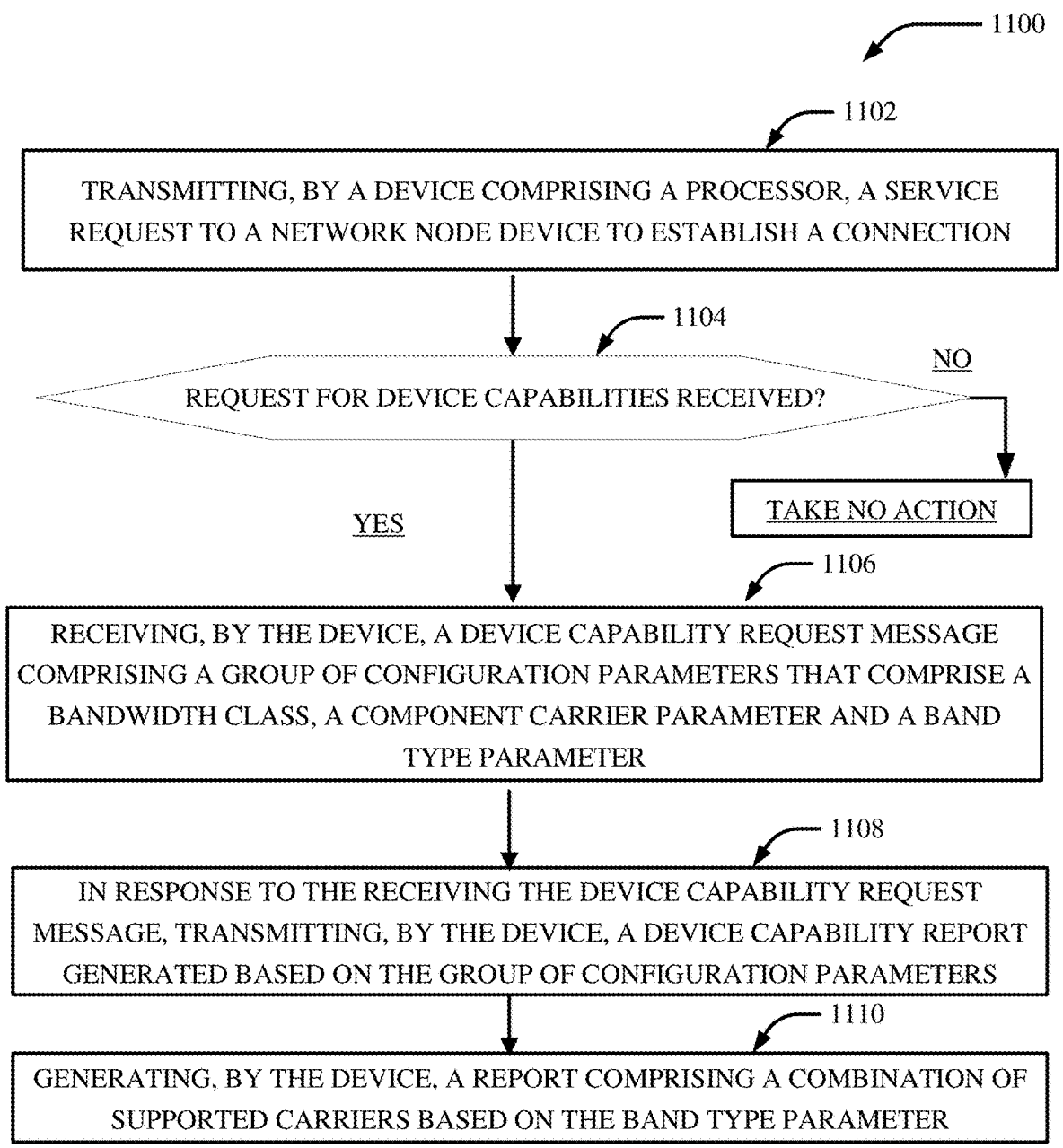
FIG. 11 depicts a diagram of an example, non-limiting computer implemented method that facilitates efficient device capabilities enquiry for establishing an initial connection with a network device in accordance with one or more embodiments described herein.

FIG. 11 depicts a diagram of an example, non-limiting computer implemented method that facilitates efficient device capabilities enquiry for establishing an initial connection with a network device in accordance with one or more embodiments described herein. In some examples, flow diagram 1100 can be implemented by operating environment 1300 described below. It can be appreciated that the operations of flow diagram 1100 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 11.

Operation 1102 depicts transmitting a service request to a network node device to establish a connection (e.g., to initiate a connection with the network node device, The UE 302 (e.g., FIG. 3) transmits a service request message). The UE 302 (e.g., FIG. 3) monitors for request for device capabilities. Operation 1104 depicts determining if a request for device capabilities was received. If determined that the request for device capabilities was received, then perform operation 1106. Otherwise, take no action and continue monitoring. Operation 1106 depicts receiving, by the device, a device capability request message comprising a group of configuration parameters that comprise a bandwidth class, a component carrier parameter and a band CA-DC type parameter. Upon receiving configuration parameters, The UE 302 (e.g., FIG. 3) generates a report in accordance with parameters provided by the network node device. Operation 1108 depicts in response to the receiving the device capability request message, transmitting, by the device, a device capability report generated based on the group of configuration parameters. Operation 1110 depicts generating, by the device, a report comprising a combination of supported carriers based on the band CA-DC type parameter.

Figure 12:
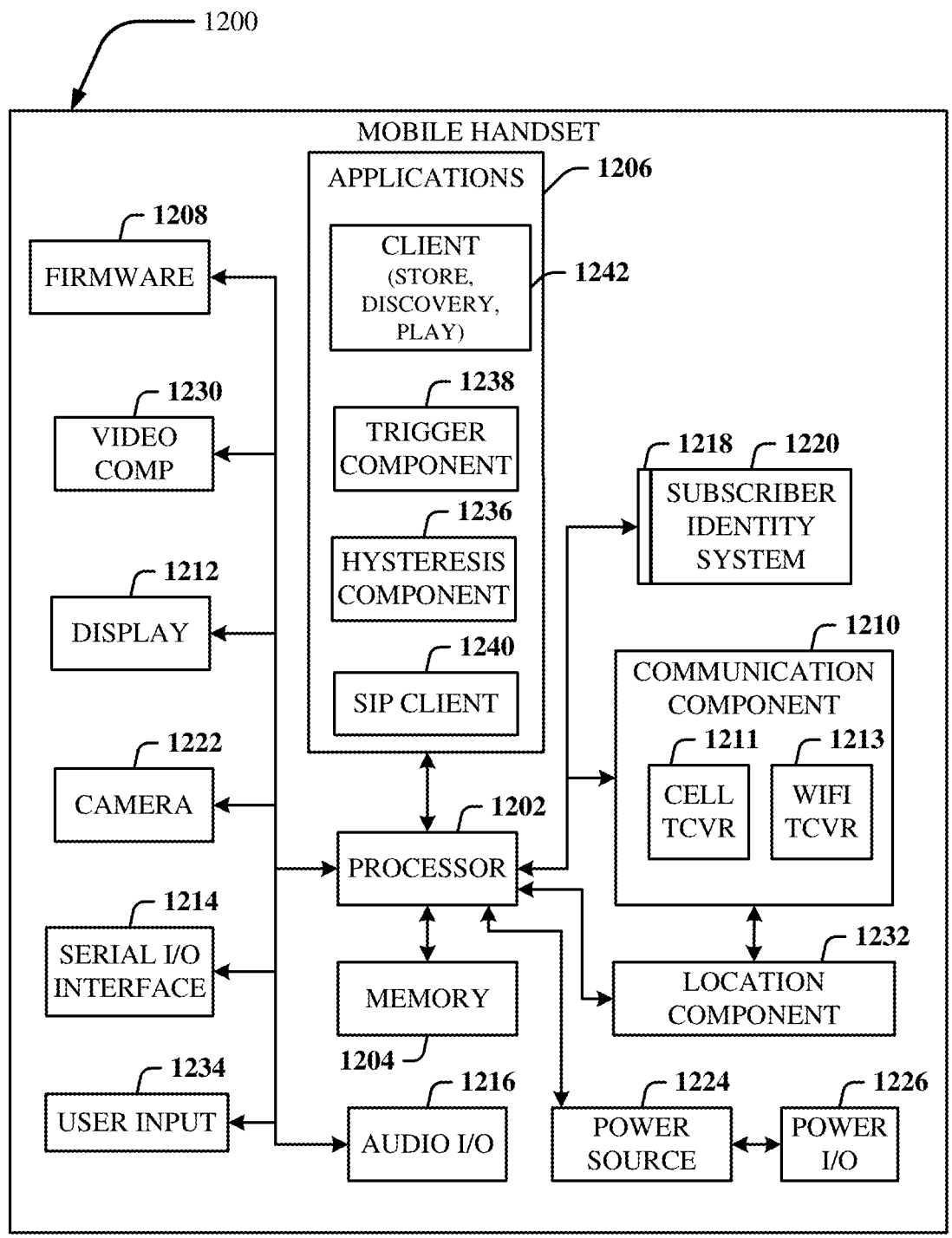
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This can support updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touchscreen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
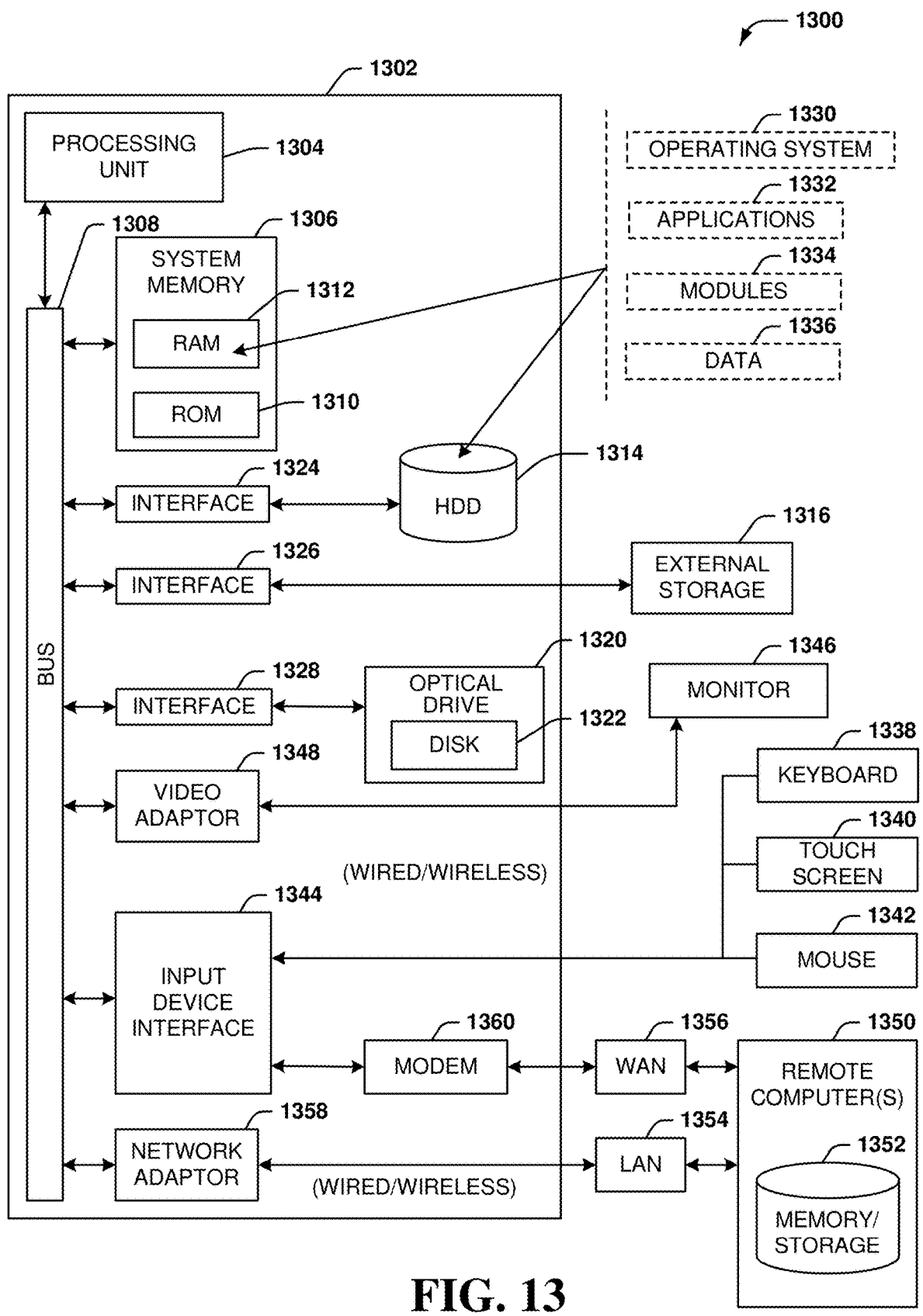
FIG. 13 illustrates an example block diagram of an example computer operable to engage in a system architecture that facilitates secure wireless communication according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server and/or communication device.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s)

1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A user equipment, comprising:
a processor; and
a memory that stores executable instructions that, when executed by the processor, facilitate performance of operations, comprising:
transmitting a service request to network equipment to establish a connection;
receiving, from the network equipment, a device capability enquiry comprising a group of configuration parameters that comprise a bandwidth class parameter, a component carrier parameter and a band type parameter, wherein respective values for the bandwidth class parameter, the component carrier parameter, and the band type parameter are selected by the network equipment to prevent a size, of a device capability message from the user equipment, from exceeding a maximum size of the device capability message supported by a network comprising the network equipment; and
in response to receiving the device capability enquiry, transmitting the device capability message generated based on the group of configuration parameters, wherein the size of the device capability message does not exceed the maximum size.

2. The user equipment of claim 1, wherein the operations further comprise:
determining whether the band type parameter indicates a contiguous band type.

3. The user equipment of claim 2, wherein the operations further comprise:
based on the determining indicating that the band type parameter indicates the contiguous band type, generating the device capability message comprising combinations of available bandwidth capabilities based on contiguous bandwidth associated with a bandwidth class indicated by the bandwidth class parameter.

4. The user equipment of claim 2, wherein the operations further comprise:
based on the determining indicating that the band type parameter does not indicate the contiguous band type, generating the device capability message comprising combinations of available bandwidth capabilities based on non-contiguous carriers associated with a bandwidth class indicated by the bandwidth class parameter.

5. The user equipment of claim 4,
wherein the device capability enquiry comprises a spectrum size of the non-contiguous carriers; and
wherein a total number of the non-contiguous carriers used is based on a number of component carriers indicated by the component carrier parameter.

6. The user equipment of claim 1, wherein the operations further comprise:
generating the device capability message comprising a combination of available bandwidth based on a band type indicated by the band type parameter.

7. The user equipment of claim 1,
wherein the service request comprises operator information; and
wherein the device capability enquiry comprises spectrum information.

8. A method, comprising:
transmitting, by a user equipment comprising a processor, a service request to network equipment to establish a connection on a network;
receiving, by the user equipment, a device capability request message comprising a group of configuration parameters that comprise a bandwidth class parameter, a component carrier parameter and a band type parameter, wherein respective values for the bandwidth class parameter, the component carrier parameter, and the band type parameter are selected by the network equipment to limit a size, of a device capability report message from the user equipment, so as not to exceed a maximum size of the device capability report message supported by the network; and
in response to receiving the device capability request message, transmitting, by the user equipment, the device capability report message generated based on the group of configuration parameters, wherein the size of the device capability report message does not exceed the maximum size.

9. The method of claim 8, further comprising:
determining, by the user equipment, whether the band type parameter indicates a non-contiguous band type.

10. The method of claim 9, further comprising:
based on the determining resulting in the band type parameter being indicative of the non-contiguous band type, generating, by the user equipment, the device capability report message comprising combinations of supported bandwidth capabilities based on non-contiguous carriers associated with a bandwidth class indicated by the bandwidth class parameter.

11. The method of claim 10,
wherein the device capability request message comprises a spectrum size of the non-contiguous carriers; and
wherein a maximum number of the non-contiguous carriers used is limited by a quantity of component carriers indicated by the component carrier parameter.

12. The method of claim 9, further comprising:
based on the determining resulting in the band type parameter not being indicative of the non-contiguous band type, generating, by the user equipment, the device capability report message comprising combinations of supported bandwidth capabilities based on a contiguous group of carriers associated with a bandwidth class indicated by the bandwidth class parameter.

13. The method of claim 8, further comprising:
generating, by the user equipment, the device capability report message comprising a combination of supported carriers based on a band type indicated by the band type parameter.

14. The method of claim 8,
wherein the service request comprises operator information; and
wherein the device capability request message comprises spectrum information.

15. A non-transitory machine-readable medium, comprising executable instructions that, when executed by a processor of a user equipment, facilitate performance of operations, comprising:
transmitting a service request to network equipment associated with a network to establish a connection on the network, wherein the service request comprises operator information;
receiving a user equipment capability enquiry, wherein the user equipment capability enquiry comprises a bandwidth class parameter, a component carrier parameter and a band type parameter, wherein respective values for the bandwidth class parameter, the component carrier parameter, and the band type parameter are selected by the network equipment to prevent a size of a user equipment capability message from the user equipment from exceeding a maximum size of the user equipment capability message supported by the network; and
in response to the receiving the device capability enquiry, transmitting the user equipment capability message generated based on the bandwidth class, the component carrier parameter and the band type parameter, wherein the size of the user equipment capability message does not exceed the maximum size.

16. The non-transitory machine-readable medium of claim 15, wherein the operations further comprise:
based on determining that the band type parameter indicates a contiguous band type, generating the user equipment capability message comprising combinations of supported bandwidth capabilities based on contiguous bandwidth associated with a bandwidth class indicated by the bandwidth class parameter.

17. The non-transitory machine-readable medium of claim 15, wherein the operations further comprise:
based on the determining that the band type parameter does not indicates a contiguous band type, generating the user equipment capability message comprising combinations of supported bandwidth capabilities in accordance with non-contiguous carriers associated with a bandwidth class indicated by the bandwidth class parameter.

18. The non-transitory machine-readable medium of claim 17,
wherein the device capability enquiry comprises a spectrum size of the non-contiguous carriers; and
wherein a total number of the non-contiguous carriers used is limited by a number of component carriers indicated by the component carrier parameter.

19. The non-transitory machine-readable storage medium of claim 15, wherein the operations further comprise:
generating the user equipment capability message comprising combination of supported bandwidth based on a band type indicated by the band type parameter.

20. The non-transitory machine-readable medium of claim 15,
wherein the device capability enquiry comprises spectrum information.

* * * * *